United States Patent
Yu et al.

(10) Patent No.: US 10,419,560 B2
(45) Date of Patent: *Sep. 17, 2019

(54) PRESENTING ADDITIONAL CONTENT ITEMS TO A SOCIAL NETWORKING SYSTEM USER BASED ON RECEIVING AN INDICATION OF BOREDOM

(71) Applicant: Facebook, Inc., Menlo Park, CA (US)

(72) Inventors: Yintao Yu, Fremont, CA (US); Meihong Wang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 355 days.

This patent is subject to a terminal disclaimer.

(21) Appl. No.: 15/408,188

(22) Filed: Jan. 17, 2017

(65) Prior Publication Data

US 2017/0126825 A1    May 4, 2017

Related U.S. Application Data

(63) Continuation of application No. 14/604,609, filed on Jan. 23, 2015, now Pat. No. 9,553,939.

(51) Int. Cl.
*H04L 29/08* (2006.01)
*G06Q 50/00* (2012.01)
*G06F 3/01* (2006.01)
*G06F 3/0488* (2013.01)
*H04L 12/26* (2006.01)

(52) U.S. Cl.
CPC .............. *H04L 67/22* (2013.01); *G06F 3/013* (2013.01); *G06F 3/04883* (2013.01); *G06Q 50/01* (2013.01); *H04L 43/16* (2013.01); *H04L 67/10* (2013.01); *H04L 67/306* (2013.01)

(58) Field of Classification Search
CPC ........ H04L 67/22; H04L 67/306; G06Q 50/01
See application file for complete search history.

(56) References Cited

U.S. PATENT DOCUMENTS

| | | | |
|---|---|---|---|
| 9,143,555 B1 | 9/2015 | Chung | |
| 9,553,939 B2* | 1/2017 | Yu | ............................ H04L 67/22 |
| 2013/0097186 A1* | 4/2013 | van Hoff | ............. G06F 16/3322 707/749 |
| 2014/0122584 A1 | 5/2014 | Gargi et al. | |
| 2015/0088801 A1* | 3/2015 | Sbaiz | ...................... H04L 67/22 706/52 |

* cited by examiner

*Primary Examiner* — Kim T Nguyen
(74) *Attorney, Agent, or Firm* — Fenwick & West LLP (57) ABSTRACT

A social networking system presents content items to a user and determines if the user has less than at threshold level of interest in the presented content items based on one or more user interactions with the presented content items. For example, the social networking system determines the user has less than the threshold level of interest in the presented content items if at threshold number of requests for content are received within a time interval. If the user has less than the threshold level of interest in the presented content items, the social networking system identifies additional content items to present to the user, and may also identify content items previously presented to the user. Content is selected form the additional content items or from the previously presented content items and presented to the user.

20 Claims, 4 Drawing Sheets

PRESENTING ADDITIONAL CONTENT ITEMS TO A SOCIAL NETWORKING SYSTEM USER BASED ON RECEIVING AN INDICATION OF BOREDOM

CROSS REFERENCE TO RELATED APPLICATIONS

This application is a continuation of U.S. application Ser. No. 14/604,609, filed Jan. 23, 2015, which is incorporated by reference in its entirety.

BACKGROUND

This disclosure relates generally to social networking systems, and in particular to presenting content to users of a social networking system.

Users of a social networking system share their interests and engage with other users of the social networking system by sharing or generating content items such as photographs, status updates, and playing social games. While this allows users to easily exchange information with other social networking system users, the amount of information gathered from users is staggering. This causes a social networking system to receive a large amount of information from users describing a wide range of events ranging from events including recent moves to a new city, graduations, births, engagements, marriages, and the like, as well as more mundane content such as status messages, information about what music has been listened to by users, and recent check-in events at coffee shops.

A social networking system presents various content items to a user based on the information it receives from other users. For example, the social networking system presents a user with content items describing various actions performed by other social networking system users. Because of the large amount of information received by a social networking system, a large number of content items may be presented to a user. However, a user may become bored with a set of content items presented by the social networking system during a time period, for example, because the user may have already consumed the available content items. This may impair user experience, which may cause the user to interact less frequently with the social networking system.

SUMMARY

A social networking system presents content items to a user of the social networking system. For example, the social networking system presents content items to the user via a news feed. Additionally, the social networking system maintains a view state identifying the content items and an order in which the identified content items are presented to the user. For example, the news feed includes multiple positions, with each content item presented in a position, so a view state identifies a content item presented to the user and a position in the news feed in which the content item was presented. Examples of content items presented by the social networking system include stories describing actions of other social networking system users and sponsored content, such as advertisements.

In one embodiment, content items are presented to a user of the social networking system via an application executing on a client device. For example, the application presents a news feed including various content items selected by the social networking system to the user. The application executing on the client device monitors interactions with the client device received from the user and determines whether the user has at least a threshold level of interest in the content items presented by the application. If the user performs an action that suggests less than the threshold level of interest in the content items, the application generates an indication of boredom associated with the user. For example, if the application receives greater than a threshold number of a specific type of interaction form the user (e.g., requests to refresh content or requests to retrieve additional content) within a threshold period of time, the application generates an indication of boredom associated with the user. If the application generates an indication of boredom associated with the user, the application sends a request from the client device to the social networking system for additional content to present to the user. Alternatively, the social networking system, rather than the application, determines whether to associate an indication of boredom associated with the user. For example, the social networking system associates an indication of boredom associated with the user if the social networking system receives more than a threshold number of requests for additional content items to present to the user from the application or from the client device within a threshold period of time.

If an indication of boredom is associated with the user, the social networking system identifies additional content items to present to the user or identifies content items previously selected for presentation to the user but not displayed to the user to again present to the user. For example, the social networking system identifies newly generated content items and previously generated content items that were not previously selected to present to the user as additional content items to again present to the user via a news feed and generates scores for the additional content items and the previously presented content items. Scores associated with additional content items or with previously presented content items may be modified based on an indication of boredom associated with the user. Based on the scores the social networking system ranks the additional content items and the previously presented content items and selects a set of the ranked content items to present to the user via the news feed. Thus, the social networking system provides alternative content items via the news feed presented to a user associated with an indication of boredom to encourage user interaction with content presented via the news feed. For example, the social networking system identifies content items that were previously selected for presentation to the user, but not previously displayed (or otherwise presented) to the user and displays one or more of the identified content items to the user by including the identified content items that were selected for presentation but not displayed in positions of the news feed where they are displayed when the social networking system determines the user has less than the threshold level of interest in the content items currently displayed to the user by the news feed. Hence, when the social networking system determines the user has less than the threshold level of interest in presented content items, the social networking system repositions content items selected for presentation to the user so content items previously selected for presentation but not presented to the user are presented to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
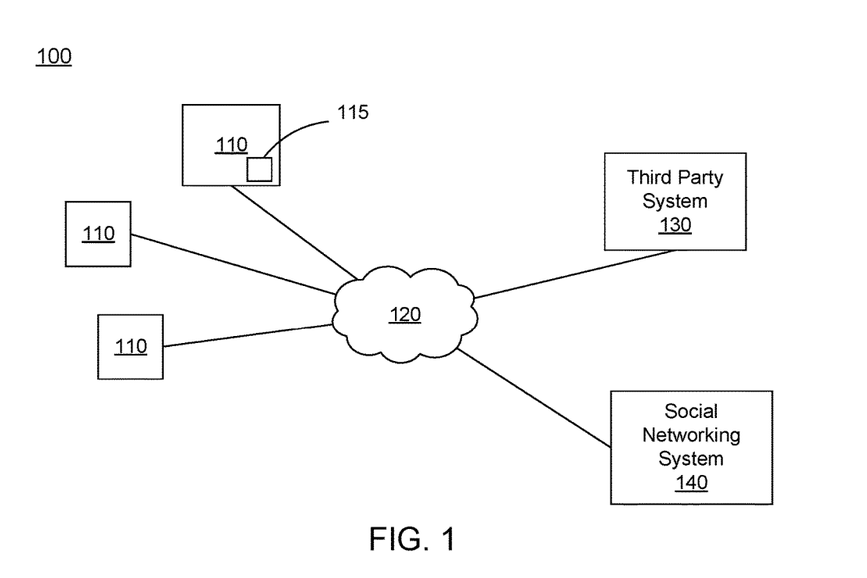
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application 115 allowing a user of the client device 110 to interact with the social networking system 140. In one example, the application 115 executing on the client device 110 communicates instructions or requests for content items from the social networking system 140 to modify content presented to a user of the client device 110. As another example, the application 115 is a browser application 115 that receives web pages including content items from the social networking system 140 and presents the web pages to a user of the client device 110. In another embodiment, the client device 110 interacts with the social networking system 140 through an application programming interface (API) running on a native operating system of the client device 110, such as IOS® or ANDROID™.

In addition to presenting content items to the user of the client device 110, the application 115 may also monitor the various user interactions with the client device 110 or with the application 115 and user input received from the user with respect to content presented to the user by the application 115. For example, the application 115 monitors when a user interacts with an interface element (e.g., a button) presented to the user for requesting additional content from the social networking system 140 or when the user performs a gesture or other interaction with the client device 110 to request additional content from the social networking system 140. Based on the monitored user interactions, the application 115 may determine one or more characteristic behaviors associated with the user. For example, based on the monitored user interactions the application 115 determines whether the user has at least a threshold level of interest in content presented by the application 115. In one embodiment, the application 115 may apply a model to the monitored interactions that determines a level of interest in content presented by the application 115 based on types of interactions performed by the user, a frequency with which different types of interactions are performed by the user, and other suitable information. Certain types of interactions by the user may occur when the user has less than a threshold level of interest in content being presented by the application 115. For example, the user may repeatedly provide an input to the application 115 to request additional or new content from the social networking system 140 within a given period of time when the user has less than the threshold level of interest in the content presented by the application 115. If the application determines the user has less than the threshold level of interest in the content presented by the application 115, the application 115 may associate an indication of boredom with the user and communicate the indication of boredom to the social networking system 140, as further described below in conjunction with FIGS. 2, 4, and 5.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications 115 for execution by a client device 110 or communicating data to client devices 110 for use by an application 115 executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
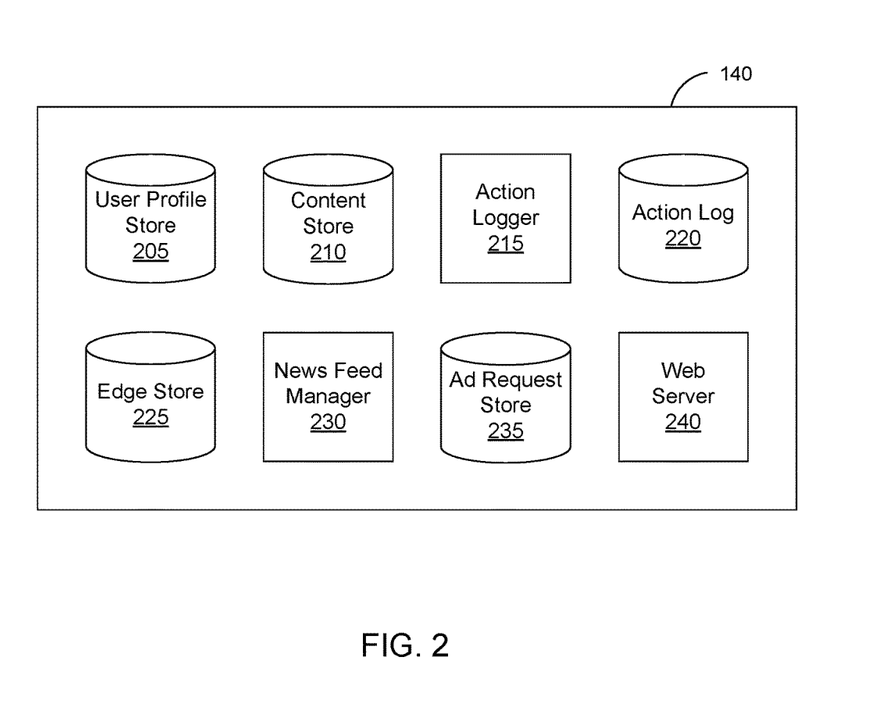
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, news feed manager 230, an advertisement ("ad") request store 235, and a web server 240. In other embodiments, the social networking system 140 may include additional, fewer, or different components than those described in conjunction with FIG. 2. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, and checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest an object or in another user in the social networking system 140 based on the actions performed by the user. A user's affinity may be computed by the social networking system 140 over time to approximate a user's interest for an object, a topic, or another user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the social networking system 140 identifies news feed stories and other content items, such as advertisements, likely to be of interest to a user through a "news feed" presented to the user. A news feed story presented to a user describes an action taken by an additional user connected to the user and identifies the additional user. Additionally, a news feed story may describe objects represented in the social networking system 140, such as an image, a video, a comment from a user, a status message, an external link, content generated by the social networking system 140, an application, a game, or other types of content items maintained by the content store 210. In some embodiments, a news feed story describing an action performed by a user may be accessible to users who are not connected to the user that performed the action. The news feed manager 230 may generate stories for presentation to a user based on information in the action log 220 and in the edge store 225 or may select candidate news feed stories from the content store 210. One or more of the candidate news feed stories are selected and presented to a user by the news feed manager 230.

The news feed manager 230 generates the news feed stories for presentation in a news feed, selects content items for presentation via the news feed, and communicates the news feed to one or more client devices 110 for presentation to users via the application 115, for example. An example of generating a news feed is further described in U.S. patent application Ser. No. 14/031,453, filed on Sep. 19, 2013, which is hereby incorporated by reference in its entirety. In one embodiment, the news feed manager 230 receives a request to present one or more news feed stories to a social networking system user from the application 115 executing on a client device 110 and accesses one or more of the user profile store 205, the content store 210, the action log 220, and the edge store 225 to retrieve information associated with the user by the social networking system 140. For example, content items, such as news feed stories, advertisements, or other data, associated with additional users connected to the user are retrieved. The retrieved content items are analyzed by the news feed manager 230 to identify candidate content items, which include content having at least a threshold likelihood of being relevant to the user. For example, content items associated with additional users not connected to the user or content items associated with additional users for which the user has less than a threshold affinity are discarded as candidate content items. Based on various criteria, the news feed manager 230 selects one or more of the candidate content items for presentation to the identified user.

In various embodiments, the news feed manager 230 presents content items, such as news feed stories, to a user through a news feed including a plurality of content items (e.g., news feed stories, advertisements, etc.) selected for presentation to the user. In some embodiments, the news feed includes a plurality of positions that are each configured to present a content item, such as a news feed story or an advertisement. The news feed may include a limited number of news feed stories or may include a complete set of candidate news feed stories. For example, the number of news feed stories included in a news feed may be determined in part by a user preference included in user profile store 205. The news feed manager 230 may also determine an order in which selected news feed stories are presented via the news feed. For example, the news feed manager 230 determines that a user has a highest affinity for a specific user and increases the number of news feed stories in the news feed associated with the specific user or modifies positions in the news feed where news feed stories associated with the specific user are presented. In one embodiment, content items presented via the news feed are presented in reverse chronological order based on timestamps associated with the content items.

The news feed manager 230 may also account for actions by a user indicating a preference for types of content items and selects content items having the same, or similar, types for presentation to the user. Additionally, the news feed manager 230 may analyze news feed stories received by the social networking system 140 from various users to obtain information about user preferences or actions. Similarly, the news feed manager 230 may analyze actions associated with a user, or with additional users connected to the user, to identify user preferences for content items. This may be used to refine subsequent selection of content items for presentation to the user via a news feed.

In addition to selecting news feed stories, the news feed manager 230 may select one or more advertisements for presentation to a user. For example, a news feed presented to a user may include one or more advertisements as well as news feed stories. To select news feed stories or advertisements for presentation via a news feed, the news feed manager determines scores for the advertisements and for the news feed stories. In one example, a score for an advertisement is based at least in part on a bid amount associated with the advertisement, a position in the news feed in which the advertisement is to be presented, and an expected amount of interaction with the advertisement. Similarly, a score for a news feed story is based at least in part on an expected amount of interaction with the news feed story and a position in the news feed in which the news feed story is to be presented. Based on the scores associated with news feed stories and advertisements, the news feed manager 230 selects one or more content items for presentation. For example, the news feed manager 230 ranks news feed stories and advertisements based on their scores and selects news feed stories or advertisements for presentation based on the ranking.

Additionally, the news feed manager 230 records, for each user on the social networking system 140, a "view state" of the content items that have been presented to each user and the order in which previously-presented content items were presented to a user. In one example, a view state associated with a user associates an identifier of a content item presented to the user with a position in a news feed in which the content item was presented. The view state at a particular time may be stored in a view state object associated with the user in the user profile store 205 or in the content store 210. Based on a view state associated with a user, the news feed manager 230 may refine subsequent selection of content items for presentation to the user.

In one embodiment, the news feed manager 230 captures a view state of the news feed for a user viewing the news feed (a "viewing user") based on actions associated with the viewing user. For example, a view state is captured when the viewing user initiates viewing of a news feed by logging into a social networking system 140. Content items (e.g., news feed stories or advertisements) are provided to the user via the news feed, and as content items are presented to the viewing user, a view state associated with the user is modified. The news feed manager 230 may update a view state associated with a viewing user after each content item is presented to the viewing user and store the updated view state in the content store 210 or in the user profile store 205. In one embodiment, the view state is updated when the viewing user's interaction with the social networking system 140 expires, such as when the user logs out of the social networking system 140. When the viewing user ceases interaction with content items presented by the social networking system 140, the view state associated with the viewing user, which includes an order in which content items were presented and indications of whether various content items were displayed to the viewing user, is stored in the content store 210, and is associated with the user's user profile stored in the user profile store 205.

Based on the view state describing content items presented to the user of the news feed presented to the user the news feed manager 230 may determine that the user is not ready to be presented with additional content items. For example, if a user starts a new session interacting with the social networking system 140 but does not navigate through content items presented via a news feed, the news feed manager 230 infers that the user has not read or has not been displayed content items presented via the news feed. If the user later starts another session interacting with the social networking system 140, the previously presented content items are again presented to the user based on a view state associated with the user.

The news feed manager 230 may receive a request for an updated or refreshed news feed, or for additional content to be included in the news feed from a user viewing the news feed (a "viewing user") via an application 115 executing on a client device 110. The application may include an indication of boredom in the request if the application 115 determines the user has less than a threshold level of interest in content items presented via the newsfeed. If the request includes an indication of boredom, the news feed manager 230 modifies selection of content items for presentation via the news feed. For example, the news feed manager 230 determines content items (e.g., news feed stories and advertisements) previously selected for presentation to the viewing user but not displayed to the viewing user, as further described below in conjunction with FIG. 5, for presentation. Additional content items that have not previously been presented to the viewing user are also identified, with content selected for presentation from the previously presented content items and from the additional content items as further described below in conjunction with FIG. 5. For example, the news feed manager 230 generates scores associated with additional content items and with previously presented content items and selects content for presentation to the viewing user based on the scores. The news feed manager 230 may use information associated with the viewing user by the social networking system 140 when selecting content from the previously presented content items and the additional content items. For example, if an indication of boredom is received along with the request for additional content, the news feed the news feed manager 230 may alter selection of content from the additional content items and the previously presented content items as further described below in conjunction with FIG. 5.

The news feed manager 230 may provide previously presented content items in positions below the additional news feed stories for presentation to the viewing user based on information received from the application 115 executing on the client device 110 associated with the viewing user indicating that the previously presented content items were displayed to the viewing user indicating that the viewing user has less than a threshold level of interest in the previously presented content items. Accordingly, the viewing user is initially presented with the additional content items, which may be ordered based at least in part on their scores, and then presented with previously presented content items. Interactions between the viewing user and the application 115 executing on the client device 110 are used to determine if the viewing user has less than the threshold level of interest in the previously presented content items. Examples of user interactions for determining the viewing user's level of interest in previously presented content items include: the viewing user accessing an interface element presented by the application 115 to retrieve additional content items, a gesture received by the application 115 to retrieve additional content items (e.g., a scroll action), interactions with content items by the viewing user, and a length of time the viewing user spends viewing content items presented via the client device 110. Determination of a level of interest in presented content items is further described below in conjunction with FIGS. 4 and 5.

One or more advertisement requests ("ad requests") are included in the ad request store 235. An advertisement request includes advertisement content (also referred to as an "advertisement") and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the social networking system 140 if advertisement content in the ad request is presented to a user, if the advertisement content in the ad request receives a user interaction when presented, or based on any other suitable condition. For example, the bid amount specifies a monetary amount that the social networking system 140 receives from the advertiser if advertisement content included in an ad request is displayed and the expected value is determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The web server 240 links the social networking system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 via the application 115 for additional content items to be presented to the user via the application 115. Additionally, the web server 240 may provide application programming interface (API) functionality to send data directly to native client device operating systems, such as IOS®, ANDROID™, WEBOS® or BlackberryOS.

Example of Providing Additional Content in a News Feed

In various embodiments, the social networking system 140 presents content items, including news feed stories and advertisements, to a user via a news feed. As the user navigates through a news feed, the user may finish viewing content items of interest to the user presented via the news feed and request additional content items for presentation. Alternatively, the user may have less than a threshold level of interest in content items presented by the news feed and may request presentation of additional content items via the news feed. To increase user interest with presented news feed stories or advertisements, the social networking system 140 may present content items previously selected for presentation to the user, such as content items not displayed to the user, or additional content items that have not been presented to the user via the newsfeed if the social networking system 140 receives an indication the user has less than a threshold level of interest in content items presented by the news feed.

Figure 3:
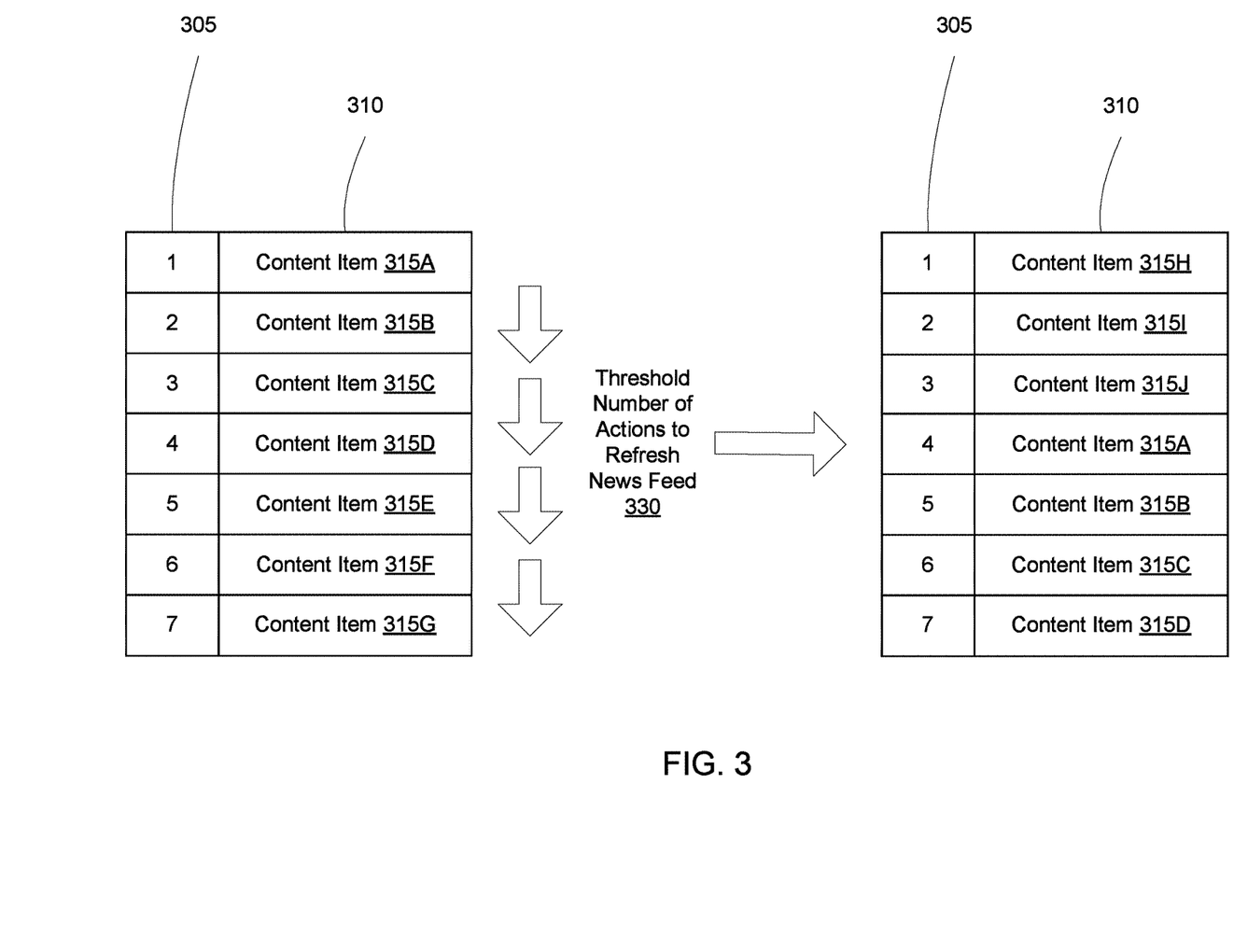
FIG. 3 is an example of arranging content in a news feed to be served to a user of the social networking system, in accordance with one embodiment.

FIG. 3 shows an example of arranging content in a news feed for presentation to a social networking system user. As used herein, "content items" include news feed stories, advertisements, or any combination thereof. In the example of FIG. 3, a news feed 310 presented to a social networking system user includes news feed stories and advertisements; however, in other embodiments, other types of content items may be presented via the news feed 310. The news feed 310 includes multiple content items 315A, 315B, 315C, 315D, 315E, 315F, 315G (individually and collectively referred to using reference number 315). Each content item 315 is presented in a position 305 of the news feed 310 representing a location in the news feed 310 in which the content item 315 is presented relative to locations in the news feed 310 in which the other content items 315 are presented. In the example of FIG. 3, content item 315A is presented in position 1, content item 315B is presented in position 2, and content items 315C, 315D, 315E, 315F, and 315G are respectively, presented in positions 3, 4, 5, 6, and 7. In this example, a user viewing the news feed 310 via the application 115 executing on a client device 110 may scroll or navigate through the news feed 310 to view content items presented in positions lower than position 7.

In FIG. 3, the social networking system 140, or the application executing on the client device 110, determines if the user has less than a threshold level of interest in the content items 315 presented via the news feed 310. The application 115 may receive a variety of user interactions associated with the news feed 310 or content items 315 presented to the user via the news feed 310 and determines the user's level of interest in the content items 315 based on the received interactions. For example, the application 115 determines the user has less than the threshold level of interest in the content items 315 in the news feed 310 if the application receives greater than a threshold number of interactions to refresh 330 the news feed 310 from the user within a threshold period of time or if the application 115 receives at least a threshold number of interactions requesting additional content items to include in the news feed 310 within a threshold period of time. For example, the application 115 determines the user has less than the threshold level of interest in the content items 315 included in the news feed 310 if the user holds and drags down the news feed 310 greater than a threshold number of times to refresh 330 the news feed 310 or to request additional content items to be presented in the news feed 310 within a threshold time interval while viewing the news feed 310 via the application 115. In another example, the application 115 determines the user has less than the threshold level of interest in the content items 315 presented by the news feed 310 if the user accesses an interface element of the application 115 that communicates a request for additional content to the social networking system 140 greater than a threshold number of times within a time interval. If the application 115 determines the user has less than the threshold level of interest in the content items 315, the application includes an indication of boredom in a request for content communicated to the social networking system. Alternatively, the social networking system 140 determines the user has less than the threshold level of interest in content items 315 in the news feed 310 based on information received by the social networking system 140. For example, the social networking system 140 determines the user has less than a threshold level of interest in the content items 315 in the news feed 310 if more than a threshold number of requests for additional content are received form the application 115 presenting the news feed 310 within a threshold period of time.

If the social networking system 140 determines the user has less than the threshold level of interest in the content items 315 presented by the news feed 310, the social networking system 140 includes additional content items in the news feed 310 in positions 305 higher than positions 305 of the content items 315 previously presented to the user in the news feed 310. In the example of FIG. 3, the social networking system 140 includes additional content items 315H, 315I and 315J in positions 1, 2 and 3 of the news feed 305, which were not previously presented to the user, which mores presentation of previously presented content items 315A, 315B, 315C, and 315D to positions 4, 5, 6, and 7, respectively, in the news feed 305. Content items 315H, 315I, 315J may be content items 315 previously presented to the user that the user did not view or may be content items that have not been presented to the user. Selection of content items based on a determination the user has less than a threshold level of interest in the content items is further described below in conjunction with FIG. 5. Content items 315E, 315F, and 315G are not shown in news feed 310 as they have been moved to positions below that of position 7. Thus, the social networking system 140 provides the user with additional content items 315 to interact with if the user has less than a threshold level of interest in content items 315 presented via the news feed 310.

Selecting Content Items and Advertisements Based on an Indication of Boredom

Figure 4:
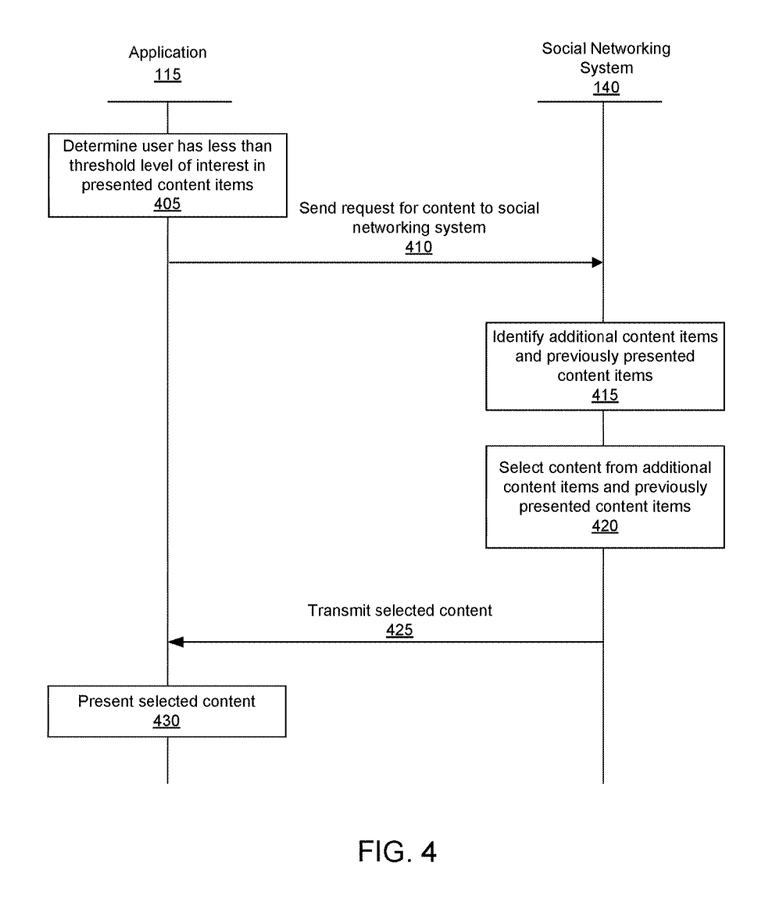
FIG. 4 is an interaction diagram of a social networking system identifying additional content items for a user based on an indication of the user's lack of interest in presented content items, in accordance with an embodiment.

FIG. 4 is an interaction diagram of one embodiment of a social networking system 140 identifying additional content items for a user based on an indication of the user's lack of interest in presented content items. As used herein, "content items" may be news feed stories, advertisements, or any other type of content. An application 115 executing on a client device 110 presents content from the social networking system 140 to the user and monitors user interaction with the application 115. Based on the monitored interactions, the application 115 determines a level of interest in presented content for the user or determines 405 if the user's level of interest in presented content is less than a threshold level. In one example, the application 115 determines 405 the user has less than the threshold level of interest in presented content items if the application 115 receives at least a threshold number of user interactions requesting presentation of additional content within a threshold period of time. For example, the user interacts with an interface element of the application 115 to request additional content or performs one or more gestures captured by the application 115 to request additional content, and the application 115 determines 405 the user has less than the threshold level of interest in content items presented by the application 115. In another example, the application 115 monitors the user's navigation through content items presented by the application 115. For example, if the user navigates through content items (e.g., scrolls through content items) for at least a threshold length of time without pausing for a threshold amount of time, the application 115 determines 405 the user has less than the threshold level of interest in the presented content items.

In one embodiment, the application 115 monitors user actions and gestures received via one or more input devices or other sensors of the client device 110 on which the application 115 is executed. For example, the application 115 may receive information describing the user's eye position based on images captured by an image capture device of the client device 110. The application 115 may process the images to determine if a user's eyes are focused on a display device of the client device 110. If the user's eyes are not focused on the display device when the news feed is presented by the application 115 for at least a threshold period of time, the application 115 determines 405 the user has less than the threshold level of interest in the presented content items. In another example, the application 115 identifies gestures performed by the user and captured by an input device (e.g., a touchscreen) of the client device 110 and determine 405 whether the user has less than the threshold level of interest in the presented content items based on the gestures. For example, if the user performs a downward swiping gesture via an input device more than a threshold number of times within a given time period, the application 115 determines 405 the user has less than the threshold level of interest in the presented content items.

Alternatively, the social networking system 140 may independently determine 405 whether the user has less than the threshold level of interest in the presented content items based on data received by the social networking system 140. For example, the social networking system 140 determines 405 the user has less than the threshold level of interest in presented content items based on a number of requests for additional content received from the application 115 within a specified time interval. If the number of requests for additional content received from the user within the specified time interval equals or exceeds a threshold number, the social networking system 140 determines 405 the user has less than the threshold level of interest in the presented content items.

The application sends 410 a request to the social networking system 140 for additional content to include in the news feed. If the application 115 determines 405 the user has less than the threshold level of interest in the presented content items, the request includes an indication of boredom associated with the user. When the social networking system 140 receives the request, the social networking system identifies 415 additional content items as well as content items previously presented to the user, as further described below in conjunction with FIG. 5. The additional content items may include content items that have not been presented to the user (e.g., newly generated content items, newly received content items) as well as previously generated content items that were not previously selected for presentation to the user. The social networking system selects 420 content from the additional content items and the previously presented content items while accounting for the indication of boredom included in the request, as further described below in conjunction with FIG. 5.

The social networking system 140 transmits 425 the selected content to the application 115, which presents 430 the selected content. For example, the social networking system 140 returns a web page including the selected content in a news feed, and the application 115 presents 430 the web page to the user. Alternatively, the social networking system 140 transmits 425 content for presentation by the application 115 in a news feed generated by the application 115. The application 115 may present 430 the selected content items in positions above the content items that were previously displayed to the user via the news feed to encourage the user to interact with new content.

Figure 5:
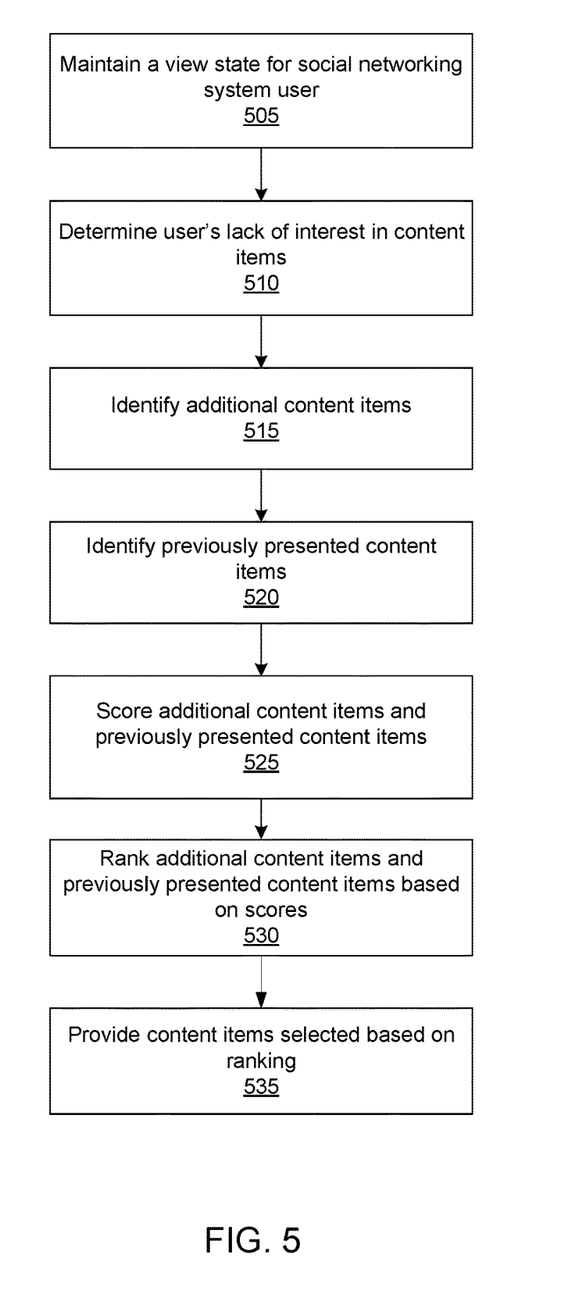
FIG. 5 is a method for selecting content items for presentation to a social networking system user requesting additional content based on an indication of the user's lack of interest in presented content items, in accordance with an embodiment.

FIG. 5 is a flow chart of one embodiment of a method for selecting content items for presentation to a social networking system user requesting additional content based on an indication of the user's lack of interest in presented content items. As used herein, "content items" may be news feed stories, advertisements, or any other type of content. The method described in conjunction with FIG. 5 may include different and/or additional steps in some embodiments, and the steps described in conjunction with FIG. 5 may be performed in different orders than the order depicted in FIG. 5 in various embodiments.

The social networking system 140 maintains 505 a view state for a social networking system user. The view state identifies content items presented to the user and an order in which the content items were presented to the user. For example, the view state associates content item identifiers with positions in a news feed in which the content items were presented. As described above, content items include news feed stories and advertisements, as well as any other suitable type of content. For purposes of illustration, FIG. 5 describes presentation of content items via a news feed, but in other embodiments the content items may be presented using any suitable format. In one embodiment, the view state for a user is stored in the content store 210 and is associated with the user's user profile stored in the user profile store 205. The view state associated with the user may be modified each time content items are presented to the user by the social networking system 140. In some embodiments, the view state is maintained 505 over time to store the order in which content items have been presented to the user via a news feed or other format. Associating a view state with a user profile maintained by the social networking system 140 allows the view state to account for presentation of content items to the user via multiple client devices 110, allowing the user to view a consistent ordering of content items when accessing content from the social networking system 140 via different client devices 110.

In one embodiment, the social networking system 140 determines 510 whether the user has less than a threshold level of interest in content presented by the social networking system 140. For example, the social networking system 140 receives a request for content from a client device 110 associated with the user that includes an indication of boredom associated with the user. An application associated with the social networking system 140 and executing on a client device 110 may monitor interactions of the user with the application 115 to determine whether the user has less than a threshold level of interest in the content presented by the social networking system 140, as described above in conjunction with FIG. 3 and FIG. 4. In some embodiments, the application 115 includes an indication of boredom in a request for content sent to the social networking system 140 if the application 115 determines the user has less than the threshold level of interest in presented content. The social networking system 140 determines 510 the user identified by the request has less than the threshold level of interest in the content if the indication of boredom is identified from the request.

Alternatively, the social networking system 140 determines 510 whether the user has less than the threshold level of interest in the presented content items independent from the application 115 based on information received from the application and associated with the user.

For example, the social networking system 140 determines 510 whether the user has at least the threshold level of interest in the content based on a number of requests for additional content associated with the user received from the application 115 or based on a frequency with which requests for content associated with the user are received from the application 115. If the social networking system 140 receives at least a threshold number of requests for additional content or receives requests for additional content at greater than a threshold frequency, the social networking system 140 determines 510 the user has less than the threshold level of interest in the presented content.

If the social networking system 140 determines 510 the user has less than the threshold level of interest in the presented content, the social networking system identifies 515 one or more additional content items that were not previously presented to the user. For example, new news feed stories, or other content items, are generated by the news feed manager 230 and maintained in a queue for presentation to the user. One or more news feed stories, or other content items, may be identified 515 from this queue as additional content items to include in the updated news feed. Identification of news feed stories is further described in U.S. patent application Ser. No. 14/031,453, filed on Sep. 19, 2013, which is hereby incorporated by reference in its entirety. In some embodiments, one or more of the additional content items are identified 515 based on changes in content items received or modified by the social networking system 140 after a time associated with a view state associated with the user that identifies content items displayed to the user. A change in content items from a view state associated with the user may indicate, for example, a new content item or a previously presented content item associated with a recent interaction by an additional user of the social networking system 140 connected to the user (e.g., an indication of preference for the previously presented content item, a comment associated with the previously presented content item, sharing the previously presented content item with a user). In one example, content items that were previously received but not selected to be presented to the user are identified 515. Additionally, one or more advertisements included in the ad request store 235 and not previously presented to the user may be identified 515 as additional content items. For example, advertisements associated with one or more targeting criteria satisfied by the user and not previously presented to the user are identified 515 from the ad request store 235 as additional content items.

In addition to identifying additional 515 content items not previously presented to the user, the social networking system also identifies 520 one or more content items previously presented to the user. For example, news feed stories or other content items previously identified for presentation to the user but not displayed to the user by a client device 110 are identified 520. As another example, the social networking system identifies 520 an advertisement previously selected for presentation to the user specified by the received request, such as an advertisement previously presented to the user but with which the user did not interact or that was not displayed to the user. To identify 520 one or more content items previously presented to the user, the social networking system 140 determines if content items have been displayed to the user identified as presented to the user by the view state associated with the user. Content items identified as presented (e.g., displayed) to the user by the view state are identified 520 along with positions in the news feed in which the content items were presented from the view state.

The social networking system 140 scores 525 the additional content items and the identified one or more previously presented content items. The social networking system 140 may differently score 525 the additional news feed stories, the previously presented news feed stories, the additional advertisements, and the previously presented advertisements. In one embodiment, the social networking system 140 scores 525 the additional news feed stories and the previously presented news feed stories based on an expected amount of user interaction with a news feed story. The expected amount of interaction may be based on an organic value associated with a news feed story; determining an organic value associated with a news feed story is further described in U.S. patent application Ser. No. 12/978,265, filed on Dec. 23, 2010, and in U.S. patent application Ser. No. 13/545,266, filed on Jul. 10, 2012, each of which is hereby incorporated by reference in its entirety.

Additionally, the social networking system 140 scores 525 the additional advertisements and the previously presented advertisements based at least in part on a bid amount associated with the advertisements and an expected amount of user interaction with the advertisement. For example, an expected value is determined for an advertisement based on a bid amount associated with the advertisement and a likelihood of the user interacting with the advertisement. The score for the advertisement is determined based at least in part on the expected value. In some embodiments, the additional content items and the previously presented content items are differently scored 525. For example, an additional cost is associated with scoring 525 previously selected but not displayed content items based on again presenting the previously selected but not displayed content items in a different position in the news feed; determining a score associated with again presenting previously selected for presentation but not displayed content items based on the position of the content items in the news feed is further described in U.S. patent application Ser. No. 14/341,680, filed on Jul. 25, 2014, which is hereby incorporated by reference in its entirety.

The social networking system 140 may modify or alter the scoring 525 of the additional content items and previously presented content items based on determining the user has less than the threshold level of interest in the presented content items. In one embodiment, the social networking system 140 scores 525 certain types of content items higher if the user has less than the threshold level of interest in the presented content items. For example, the social networking system 140 increases scores of news feed stories relative to advertisements if the user has less than the threshold level of interest in the presented content items. As another example, the social networking system 140 increases scores of additional content items relative to scores of previously presented content items if the user has less than the threshold level of interest in the presented content items. Alternatively, if the user has less than the threshold level of interest in the presented content items, the social networking system modifies thresholds used to identify content items to score 525. In some embodiments, affinity between the user and news feed stories previously provided to a client device 110 but not presented to the user or between additional users associated with news feed stories previously provided to a client device 110 for presentation to the user but not displayed to the user are compared to a threshold score, with previously presented content items for which the user has at least a threshold affinity scored 525. The social networking system 140 may modify the threshold score on determining 510 the user has less than the threshold level of affinity for the content items. For example, the social networking system reduces a threshold affinity between the user and a previously presented news feed story used to identify the previously presented news feed story for scoring 525 or reduces a threshold affinity between the user and an additional content item to identify the additional content item for scoring 525.

Based at least in part on the scores, the social networking system 140 selects content from the additional content items or from the previously presented content items for presentation to the user. In one embodiment, the additional content items and the previously presented content items are ranked 530 based on their associated scores. In one embodiment, scores associated with additional news feed stories, scores associated with previously presented news feed stories, scores associated with additional advertisements, and scores associated with previously presented advertisements are converted into a common unit of measurement, so advertisements and news feed stories are ranked 530 together in a single ranking. Ranking both news feed stories and advertisements is further described in U.S. patent application Ser. No. 13/545,266, filed on Jul. 10, 2012, which is hereby incorporated by reference in its entirety. Alternatively, news feed stories are ranked 530 based on their associated scores and advertisements are separately ranked 530 based on their associated scores.

Based on the ranking, one or more content items are selected and provided 535 to an application 115 executing on a client device 110 for presentation to the user. For example, content items having at least a threshold position in the ranking or having at least a threshold score are selected and provided 535 to the application 115 executing on the client device 110 for presentation to the user. In some embodiments, the social networking system 140 modifies the threshold position or threshold ranking for selecting content items if the user is determined to have less than the threshold level of interest in the presented content items (e.g., the social networking system 140 lowers a threshold score or a threshold position in the ranking to increase the number of content items selected). If a content item previously presented to the user is selected for subsequent presentation, the content item is removed from its original position in the news feed and provided 535 for presentation in an alternative position in the news feed. In one embodiment, content items having at least a threshold position in the ranking are provided in the order determined by the ranking, while remaining content items are presented in a chronological order, such as reverse chronological order. After the new content items are provided 535 to the application 115 executing on the client device 110, the view state for the user is updated to include the modified ordering of the content items provided to the user in the news feed to indicate the positions in the news feed in which the content items are presented. The updated view state is stored in the content store 210 and associated with a user profile of the user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   presenting an initial set of content items in a feed of content items for display on a client device to a user;
   determining that the user has less than a threshold level of interest in the initial set of content items in the feed;
   identifying additional content items to provide to the user in the feed based on determining that the user has less than the threshold level of interest;
   selecting one or more content items of the identified additional content items; and
   updating the feed of content items to include the selected one or more content items of the identified additional content items to the user in the feed with at least a subset of the initial set of content items.

2. The computer-implemented method of claim 1, wherein determining that the user has less than the threshold level of interest includes:
   monitoring user navigation through content items presented in the feed; and
   determining that the user has not paused during the user navigation for at least a threshold period of time.

3. The computer-implemented method of claim 1, wherein determining that the user has less than the threshold level of interest includes:
   receiving information describing an eye position of the user based on one or more images captured by an image capture device of the client device;
   determining that the user is not focused on a display device of the client device based on the eye position while the feed is presented for at least a threshold period of time.

4. The computer-implemented method of claim 1, wherein determining that the user has less than the threshold level of interest includes:
   receiving a threshold number of user interactions with the feed within a specified time interval.

5. The computer-implemented method of claim 4, wherein the threshold number of user interactions correspond to requests for additional content within the specified time interval via a user interface of the client device.

6. The computer-implemented method of claim 5, wherein the requests for additional content correspond to a downward swiping gesture via the user interface of the client device.

7. The computer-implemented method of claim 1, wherein the identifying additional content items to provide to the user in the feed includes:
   identifying a first set of newly generated content items that have not been presented to the user, a second set of previously generated content items that were not previously selected for presentation to the user, and a third set of previously selected content items that have been presented to the user;
   determining a score for each content item in the first set, the second set, and the third set of content items;
   modifying scores of the second set of content items by applying an additional cost to the previously generated content items that were not previously selected for presentation to the user; and
   selecting the one or more content items of the identified additional content items based at least in part on the determined scores.

8. The computer-implemented method of claim 1, wherein identifying the additional content items to provide to the user in the feed comprises:
   Identifying one or more content items received by an online system during a time interval between a current time and a time associated with the user previously viewing content items presented in the feed.

9. A computer-implemented method comprising:
   presenting, via an application associated with an online system, an initial set of content items for display on a client device in a feed of content items;
   receiving, via the client device, information indicating less than a threshold level of interest in the initial set of content items presented in the feed;
   identifying additional content items to provide to a user in the feed based on the received information indicating less than the threshold level of interest;
   selecting one or more content items of the identified additional content items; and
   updating the feed of content items to include the selected one or more content items of the identified additional content items to the user in the feed with at least a subset of the initial set of content items.

10. The computer-implemented method of claim 9, wherein receiving information indicating less than the threshold level of interest comprises:
receiving a plurality of requests for content to provide to the user from the client device; and
determining the user has less than the threshold level of interest in the initial set of content items in response to a number of the received plurality of requests during a time interval equals or exceeds a threshold value.

11. The computer-implemented method of claim 9, wherein receiving information indicating less than the threshold level of interest comprises:
identifying an indication of boredom associated with a user of the client device and included in a request for content received from the application, the application being configured to determine the threshold level of interest in the initial set of content items based on a number of interactions requesting content from the user within a threshold period of time.

12. The computer-implemented method of claim 11, wherein an interaction requesting content is selected from a group consisting of: interacting with an interface element to request content, performing a gesture to request content, navigating through presented content, and any combination thereof.

13. The computer-implemented method of claim 9, wherein determining that the user has less than the threshold level of interest includes:
monitoring user navigation through content items presented in the feed; and
determining that the user has not paused during the user navigation for at least a threshold period of time.

14. The computer-implemented method of claim 9, wherein determining that the user has less than the threshold level of interest includes:
receiving information describing an eye position of the user based on one or more images captured by an image capture device of the client device;
determining that the user is not focused on a display device of the client device based on the eye position while the feed is presented for at least a threshold period of time.

15. The computer-implemented method of claim 9, wherein the identifying additional content items to provide to the user in the feed includes:
identifying a first set of newly generated content items that have not been presented to the user, a second set of previously generated content items that were not previously selected for presentation to the user, and a third set of previously selected content items that have been presented to the user;
determining a score for each content item in the first set, the second set, and the third set of content items;
modifying scores of the second set of content items by applying an additional cost to the previously generated content items that were not previously selected for presentation to the user; and
selecting the one or more content items of the identified additional content items based at least in part on the determined scores.

16. A non-transitory computer readable storage medium including instructions that, when executed by a processor, cause the processor to:
present an initial set of content items in a feed of content items for display on a client device to a user;
determine that the user has less than a threshold level of interest in the initial set of content items in the feed;
identify additional content items to provide to the user in the feed based on determining that the user has less than the threshold level of interest;
select one or more content items of the identified additional content items; and
update the feed of content items to include the selected one or more content items of the identified additional content items to the user in the feed with at least a subset of the initial set of content items.

17. The non-transitory computer readable storage medium of claim 16, wherein determining that the user has less than the threshold level of interest includes:
monitoring user navigation through content items presented in the feed; and
determining that the user has not paused during the user navigation for at least a threshold period of time.

18. The non-transitory computer readable storage medium of claim 16, wherein determining that the user has less than the threshold level of interest includes:
receiving information describing an eye position of the user based on one or more images captured by an image capture device of the client device;
determining that the user is not focused on a display device of the client device based on the eye position while the feed is presented for at least a threshold period of time.

19. The non-transitory computer readable storage medium claim 16, wherein the identifying additional content items to provide to the user in the feed includes:
identifying a first set of newly generated content items that have not been presented to the user, a second set of previously generated content items that were not previously selected for presentation to the user, and a third set of previously selected content items that have been presented to the user;
determining a score for each content item in the first set, the second set, and the third set of content items;
modifying scores of the second set of content items by applying an additional cost to the previously generated content items that were not previously selected for presentation to the user; and
selecting the one or more content items of the identified additional content items based at least in part on the determined scores.

20. The non-transitory computer readable storage medium of claim 16, wherein identifying the additional content items to provide to the user in the feed comprises:
identifying one or more content items received by an online system during a time interval between a current time and a time associated with the user previously viewing content items presented in the feed.

* * * * *